US009872057B1

(12) United States Patent
Kahn et al.

(10) Patent No.: US 9,872,057 B1
(45) Date of Patent: Jan. 16, 2018

(54) METHOD AND SYSTEM FOR ACCESSING CONTENT IN ANOTHER FORMAT IN A COMMUNICATIONS SYSTEM

(75) Inventors: Raynold M. Kahn, Los Angeles, CA (US); Dien L. Nguyen, Torrance, CA (US); Joseph T. Hayes, Torrance, CA (US); Jianming Yu, Norwalk, CA (US); Kapil Chaudhry, Cerritos, CA (US); An T. Lam, Alhambra, CA (US); Don E. Cansino, Brea, CA (US); Yeung K. Chan, Rancho Palos Verdes, CA (US); Charles C. DeBergh, Newport Coast, CA (US); Lonnie Scott Clabaugh, San Pedro, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 431 days.

(21) Appl. No.: 12/957,186

(22) Filed: Nov. 30, 2010

Related U.S. Application Data

(60) Provisional application No. 61/265,292, filed on Nov. 30, 2009.

(51) Int. Cl.
*H04N 21/2343* (2011.01)
*H04N 21/258* (2011.01)

(52) U.S. Cl.
CPC ............. *H04N 21/25816* (2013.01); *H04N 21/234309* (2013.01); *H04N 21/25875* (2013.01)

(58) Field of Classification Search
CPC ..... H04N 21/234309; H04N 21/23439; H04N 21/25816; H04N 21/25875

USPC ...................................... 725/25, 87
See application file for complete search history.

(56) References Cited

U.S. PATENT DOCUMENTS

| 7,567,565 | B2 * | 7/2009 | La Joie ............... H04L 12/2801 348/555 |
| 2007/0067806 | A1 * | 3/2007 | Russell et al. .................. 725/61 |
| 2007/0169161 | A1 * | 7/2007 | Kienzle ............. H04N 7/17336 725/115 |
| 2011/0023076 | A1 * | 1/2011 | Park ................. H04N 21/44209 725/116 |
| 2011/0093900 | A1 * | 4/2011 | Patel et al. ...................... 725/54 |

OTHER PUBLICATIONS

Notice of Allowance dated Jun. 7, 2016 in U.S. Appl. No. 14/871835, filed Sep. 30, 2015 by Luan Le-Chau et al.

* cited by examiner

*Primary Examiner* — Dominic D Saltarelli
(74) *Attorney, Agent, or Firm* — Harness, Dickey & Pierce, PLC

(57) ABSTRACT

A method and system for accessing content includes a user device and a subscription manager that generates a first identifier associated with a first content in a first format and a second identifier associated with the first content in a second format. The system also includes a conditional access system that communicates a first identifier, the second identifier and rules to the user device. The user device accesses the first content with the first format in response purchasing the first content in the first format. The user device selects the first content in the second format and accesses the first content in the second format in response to purchasing the first content in the first format and the rules.

37 Claims, 8 Drawing Sheets

US 9,872,057 B1

METHOD AND SYSTEM FOR ACCESSING CONTENT IN ANOTHER FORMAT IN A COMMUNICATIONS SYSTEM

TECHNICAL FIELD

The present disclosure relates generally to a content communication system, and, more specifically, to a system and method for ordering and accessing content distributed by the communication system.

BACKGROUND

The statements in this section merely provide background information related to the present disclosure and may not constitute prior art.

Satellite television is increasing in popularity due to the ever-increasing amount of programming as well as the quality of programming. Programming includes standard national broadcasts, local or regional station broadcasts, on-demand content and interactive content. Programming services may be ordered by subscription or pay-per-view.

Impulse pay-per-view occurs when a customer selects to purchase content directly from the user device, such as a set top box, in response to a menu or other prompt. The program is authorized for viewing by the set-top-box, and the impulse pay-per-view selection is communicated from the set-top-box to a billing system for billing the customer the appropriate amount. Another type of pay-per-view system is order-ahead pay-per-view. Order-ahead pay-per-view occurs when a customer selects to purchase using a customer-service agent, a website, a web-based cell phone, or interactive voice menu system. The order-ahead pay-per-view selection is communicated to the billing system for billing the customer the appropriate amount, and the viewing authorization is communicated to the set-top-box. Both impulse pay-per-view and order-ahead pay-per-view may be provided in a single system.

The service provider may communicate real-time content to all users at a specific scheduled time for live viewing or for recording by a DVR for later viewing. This is referred to as linear content. The service provider may also communicate non-real-time content that is faster or slower than normal program viewing. Such transmission is not intended for live viewing but is only intended for recording by a DVR for later viewing. This is referred to as non-linear content. The non-linear content may be provided at different rates and at different times as well. A pre-set broadcast schedule is not published, but the non-linear content may be recorded when a customer selects to record the content from a published list of available programs. This selection may be made from a user device, such as a set top box, or from a website or a web-based cell phone. Non-linear content may also be recorded to the DVR by the service-provider without prior user request. Non-linear content may also be recorded on-demand over the internet.

Linear content may be purchased by IPPV or OPPV for live viewing at the scheduled broadcast time. Linear and non-linear content may purchased by IPPV or OPPV for viewing recorded content. Typically, the user may not recognize whether a recording was based on a linear or non-linear content. One problem with such a configuration is that if one type of content format is purchased, viewing of the same content in a different format type would require another purchase in another format. Likewise, when one content is in a different definitional format, such as high-definition versus standard definition, access to the standard definition content may not be obtained without purchase when high-definition content has already been paid for.

SUMMARY

The present disclosure provides a system for authorizing a user to access different formats of content after content in a different format is authorized or paid for. Authorizing content may be performed according to various rules that may include authorizing content for format levels that are equal to or less than the paid-for content.

In one aspect of the disclosure, a method includes purchasing a first content in a first format, selecting a first content in a second format for viewing at a user device, enabling viewing of the first content in a second format based on purchasing the first content in the first format and viewing the content in the second format.

In another aspect of the disclosure, a method includes generating a first identifier associated with a first content in a first format, generating a second identifier associated with the first content in a second format, communicating a first identifier, the second identifier and rules to a user device, enabling the first content with the first format in response purchasing the first content in the first format, selecting the first content in the second format and enabling access to the first content in the second format in response to purchasing the first content in the first format and the rules.

In yet another aspect of the disclosure, a method and system for accessing content includes a user device and a subscription manager that generates a first identifier associated with a first content in a first format and a second identifier associated with the first content in a second format. The system also includes a conditional access system that communicates a first identifier, the second identifier and rules to the user device. The user device accesses the first content with the first format in response purchasing the first content in the first format. The user device selects the first content in the second format and accesses the first content in the second format in response to purchasing the first content in the first format and the rules.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
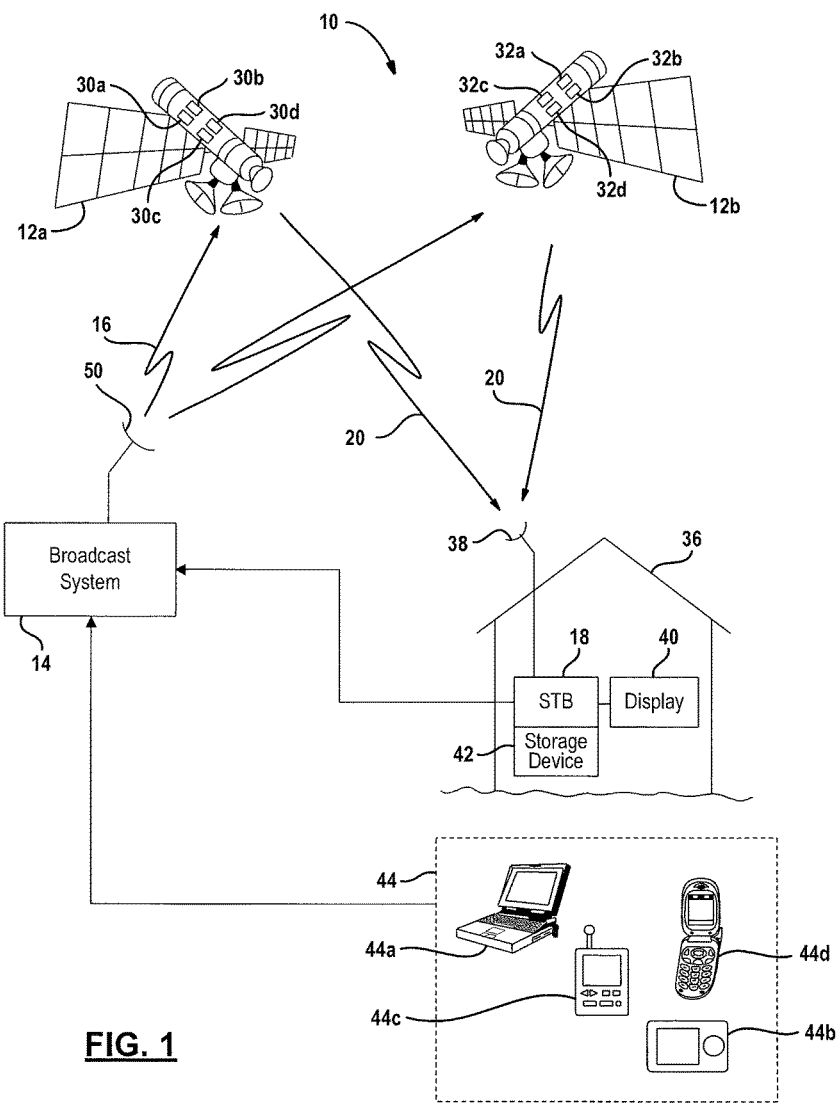
FIG. 1 is a system level view of the communication system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure is set forth with respect to a satellite broadcast television system. In particular, the following disclosure is made with respect to DIRECTV® broadcast services and systems. It should be understood that many other delivery systems are readily applicable to disclosed systems and methods. Such systems include other wireless distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE), integrated receiver/decoders (IRDs) and a content delivery network (CDN) as described below can be reallocated as desired without departing from the intended scope of the present patent.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

Referring now to FIG. 1, a satellite communication system 10 is illustrated having a first satellite 12a and a second satellite 12b. The communication system 10 may be a satellite television system or data distribution system.

The system 10 may include a broadcast system 14 for generating uplink signal 16 to the satellites 12a and 12b. The signals may correspond to various channel streams or multiplex channel streams that are communicated from the satellites 12a, 12b to a fixed user device 18 through downlinks 20. Only one user device 18 is illustrated by way of example. However, a system 10 may include several user devices.

Satellite 12a may include a plurality of transponders of which four are illustrated as reference numerals 30a-30d. The satellite 12b may also include a plurality of transponders including transponders 32a-32d. The transponders 30a-30d and 32a-32d receive the uplink signals from the broadcast system 14 and direct the signal, such as television signals, through the downlinks 20 to various users. The downlink signals 20 may be Continental United States (CONUS) or may be spot beam signals. As will be further described below, various allocations of channel signals to the various transponders may be provided. Transponders 30a, 30b, 32a and 32b are uplink transponders. Transponders 30c, 30d, 32c and 32d are downlink transponders. Although only four are illustrated, several different uplink transponders and downlink transponders may be provided in each satellite.

The user device 18 may comprise a set top box (STB) disposed within a home or business 36. An antenna 38 is used to receive the downlink signals 20 and provide them to the user receiving device 18. The user receiving device 18 may be in communication with a display 40 for displaying the channel signals. The user device 18 may communicate interactive signals to the broadcast system 14 through various means include a wired or wireless network.

The set top box 18 may also have a storage device 42 associated therewith. The storage device 42 may be integrated within the set top box 18. The storage device 42 may include a digital video recorder that uses a hard disk drive for recording content that is received at the set top box 18. The storage device 42 may also be a chip or plurality of memory chips. The storage device 42 may be used for storing program associated data (PAD) such as various authorized content levels and rules associated therewith. The rules may be used to determine when selected content is authorized for viewing on a particular user device.

Another type of user device may also be included in the system, a mobile receiving device 44. A plurality of mobile receiving devices is illustrated in box 44. A portable computer 44a, a portable media player 44b, a personal digital assistant 44c and a cellular telephone 44d are illustrated. Each of the devices includes an antenna that may be integrated therewith for receiving the downlink signals 20. Different types and numbers of mobile devices may also be included in the system. It should be noted that both fixed and mobile user devices may be included. Of course, either fixed or mobile alone may be used in a system. The mobile device 18 may also communicate interactive signals to the broadcast system 14 through various means include a wired or wireless network. Although not specifically illustrated, each mobile receiving device 44 may include a storage device that is used to store and receive video and associated audio therewith in a similar manner to that described above with respect to the storage device 42 for set top box 18.

The broadcast system 14 includes an antenna 50 for uplinking uplink signal 16 to satellites 12a and 12b. Although only one antenna 50 is illustrated for simplicity purposes, more than one antenna may be used.

Figure 2:
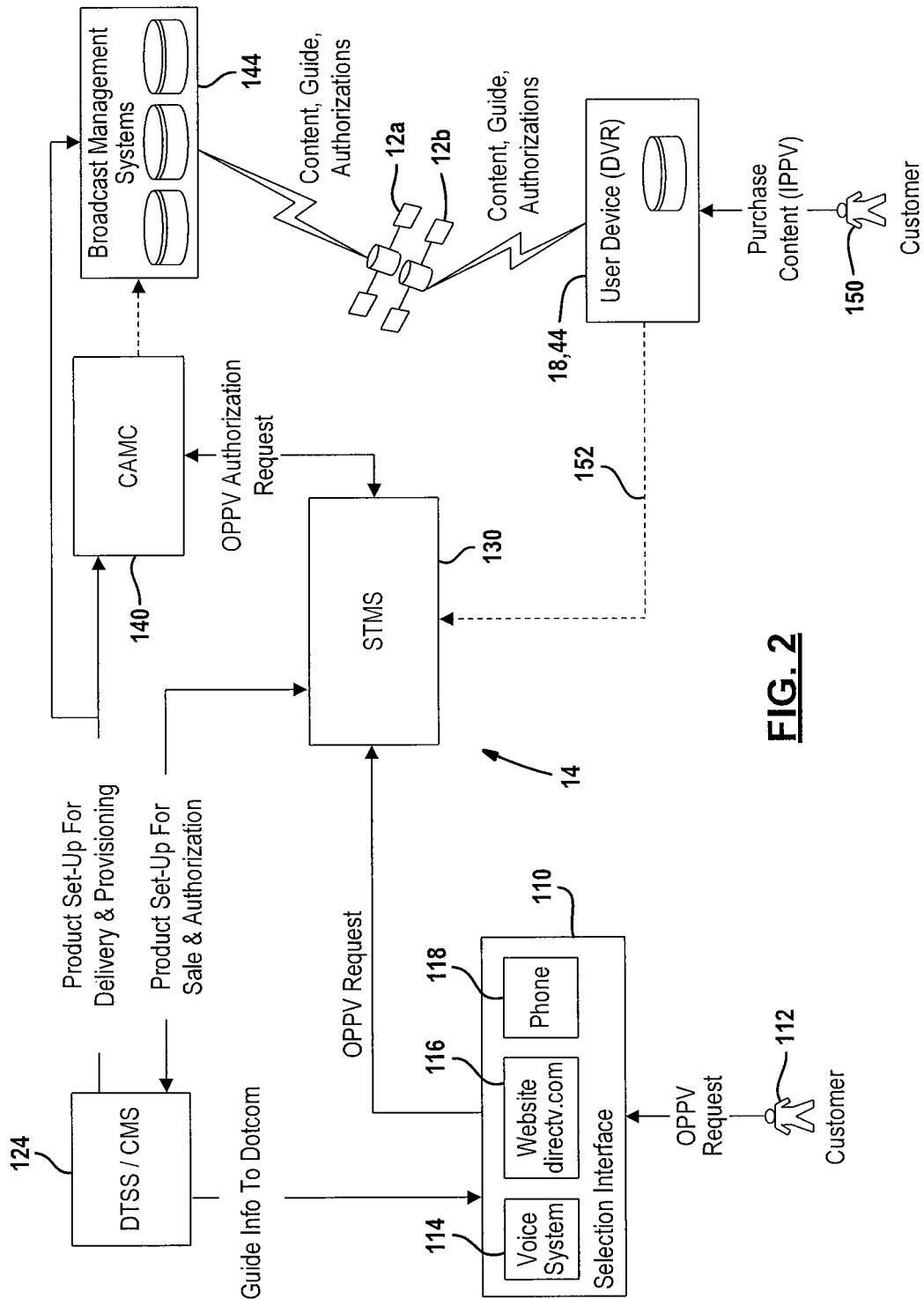
FIG. 2 is a high-level block diagrammatic view of the push scheduler in relation to other components within a broadcast system.

Referring now to FIG. 2, a block diagrammatic view of the broadcast system 14 of FIG. 1 is illustrated in further detail. The broadcast system 14 may include a selection interface device 110. The selection interface device 110 may include various types of selection interface devices for purchasing order-ahead paid-per-view (OPPV) content. A customer 112 may generate an order-ahead pay-per-view request using one of the selection interface devices. As illustrated, the selection interface devices 110 include a voice system 114, a website 116 and a phone device 118. The voice system 114 may include an interactive voice recognition (IVR) system used for selecting various types of order-ahead content. The website 116 may also be used for selecting various types of content. The customer 112 may interface with the website 116 through a computer or another internet-enabled device. A phone 118 is one example of an Internet-enabled device. The phone 118 may be a device such as the Apple® Iphone®. Of course various other Internet-enabled phone-type devices may be used. The desired pay-per-view request may be selected from various menu systems displayed within or associated with the selection interface device DTSS/CMS 124.

A traffic and scheduling system and content management system 124 may provide the selection interface device 110 with a list of content available for ordering. Data for forming a list in a visual and/or audio form may be provided. In this figure, the DTSS/CMS 124 are illustrated together for simplicity. They may be separate systems as illustrated below. As will be described below, the traffic and scheduling system and the content management system 124 may include various web interfaces such as a listing service for providing the orderable content.

The selection interface device 110 may be provided to a subscriber transaction management system (STMS) 130. The subscriber transaction management system 130 may enable billing a customer for the ordered content. Pre-authorizations may be provided between the STMS 130 and the DTSS/CMS 124. The DTSS/CMS 124 may provide the STMS 130 with product setup for authorization for a sale. Once a sale has been authorized, an authorization request signal may be provided to a conditional access management system 140 (CAMC) from the STMS 130. Program information packets (PIP), program-associated data (PAD), future program-associated data (FPAD) and control word packets (CWP) may be generated by the DTSS/CMS 124. The conditional access management system 140 may be in communication with the DTSS/CMS 124 system and the STMS 130. The conditional access management system (CAMC) 140 may provide the conditional access authorization signals to the user device 18, 44 through the satellites 12A, 12B through a broadcast management system 144. The broadcast management system 144, as will be described below, may include a content management system, video ingestion and encryption, storage systems, and program guide systems.

The user device 18, 44 may receive guide information for linear broadcast such as pay-per-view linear content broadcast. The guide information may come from the broadcast management system 144.

The customer 150 may generate an impulse pay-per-view (IPPV) request to authorize viewing of the content, and communicate the viewing of the content from the user device 18, 44 to the STMS 130. The IPPV request may be communicated to the billing system 130 through various types of networks 152, such as a telephone network, satellite network, broadband network, cellular phone network, or the like.

Figure 3A:
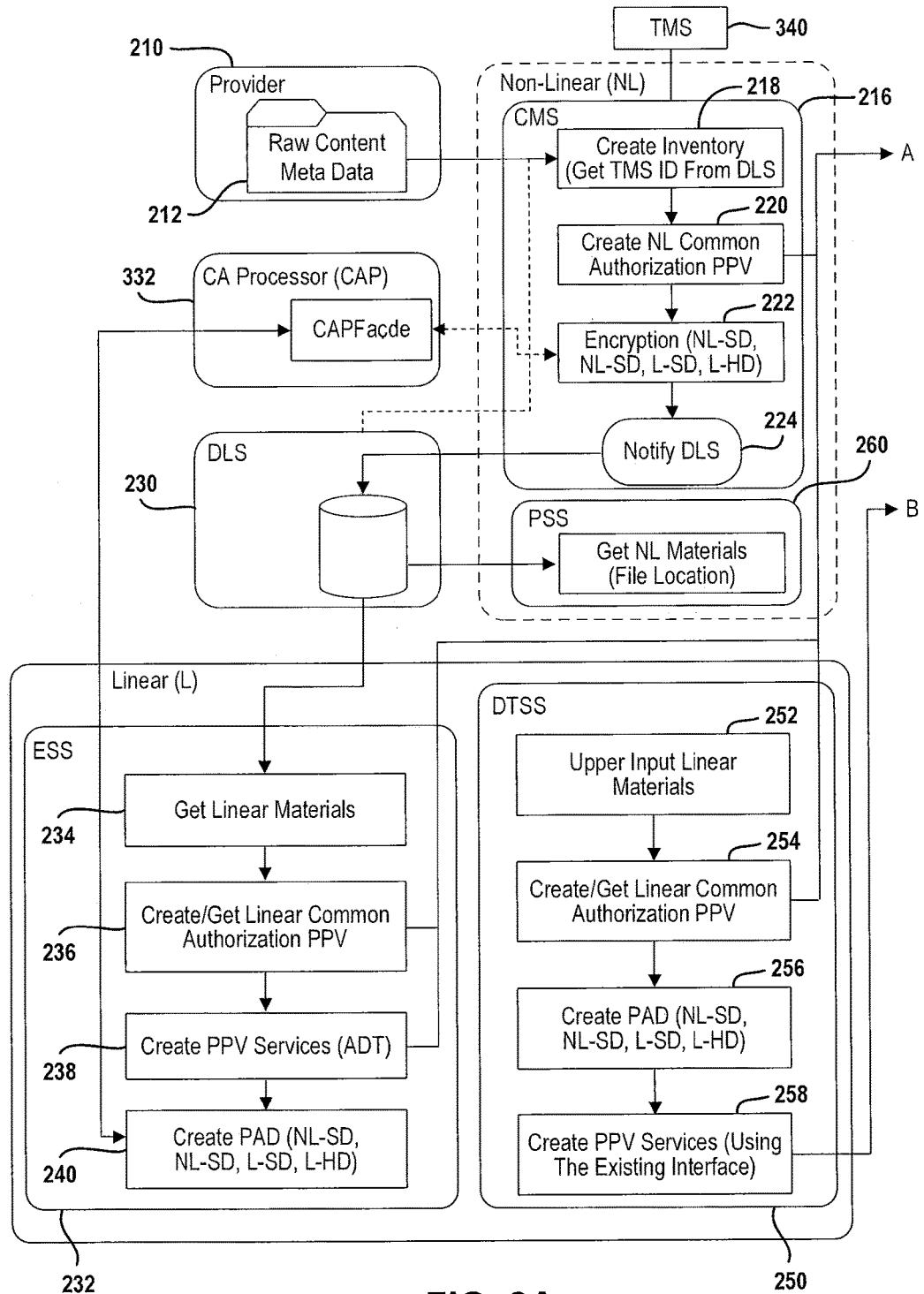
FIGS. 3A and 3B are a block diagrammatic/flowchart of the interaction between the subscription manager of the present disclosure and other broadcast components.
Figure 3B:
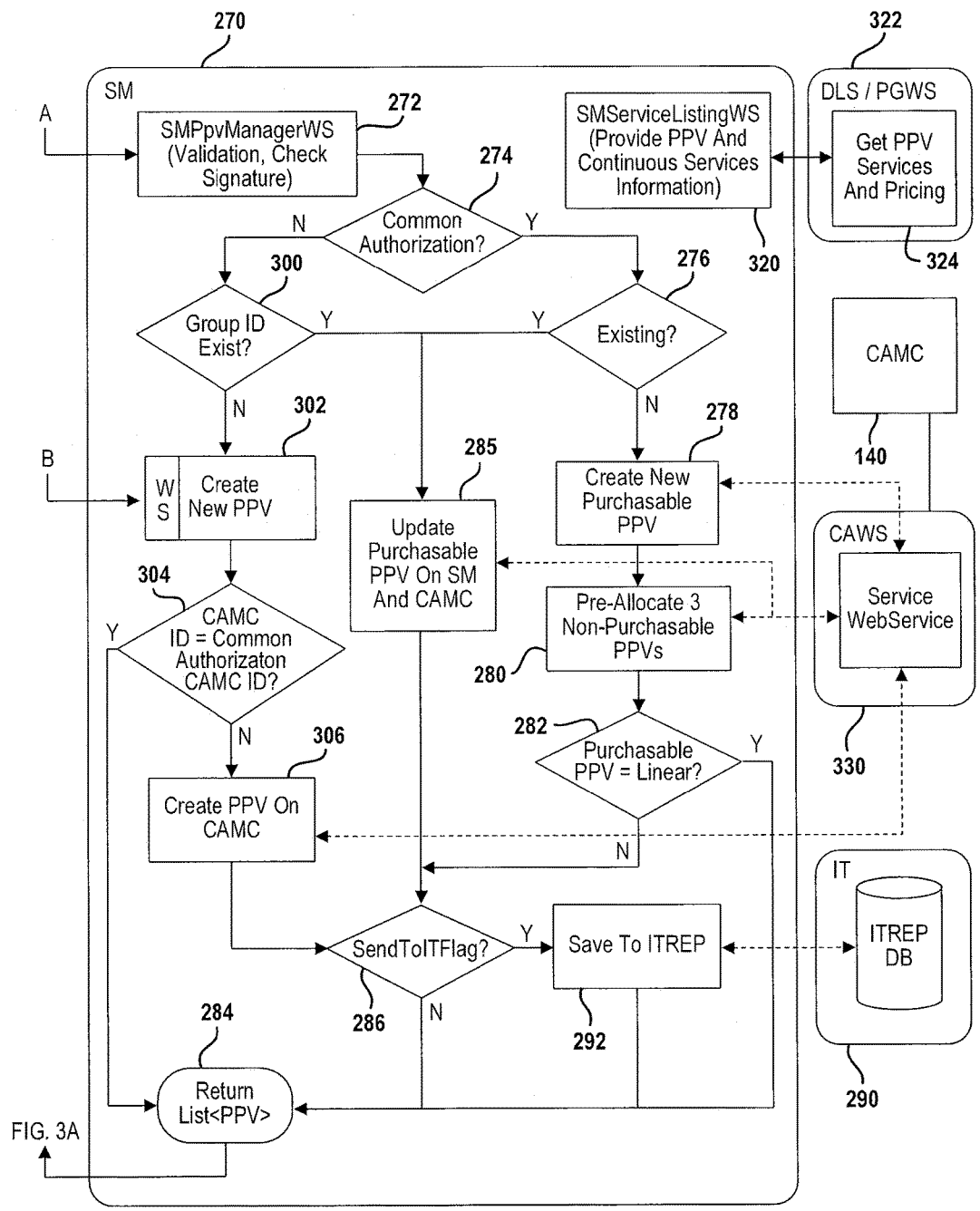

Referring now to FIGS. 3A and 3B, a provider 210 may provide raw content and metadata into the system. The raw content may be content such as movies, television shows, data, or other types of content. The metadata may include various types of metadata including, but not limited to, titles, actors, studios, descriptions of the content and the like.

The provider 210 may provide the raw content and metadata to a content management system 216. The content management system 216 may perform various functions including creating an inventory at step 218, creating or requesting non-linear common authorization pay-per-views in step 220, generating various types of encryption such as high-definition, standard definition, linear and non-linear types in step 222 and notifying a listing service in step 224.

A DIRECTV® listing service (DLS) 230 may also be in communication with the CMS 216. The listing service 230 may receive content material data such as metadata from the CMS 216. The DLS 230 may also provide channel data to an Event Scheduler System (ESS) 232. The channel data may include but is not limited to channel start time, a channel stop time, a content channel bit rate, a transponder identifier, and a service channel identifier. CRID and scheduling data may be requested by the DLS 230.

The Event Scheduling System (ESS) 232 and DIRECTV® traffic and scheduling system (DTSS) 250 support scheduling of linear content. They use similar but slightly different operational steps when creating schedules.

The ESS 232 may be used to schedule various types of content. The ESS 232 may get linear materials in step 234, create or request linear common authorization for the pay-per-views in step 236, create pay-per-view services such as all-day tickets in step 238, and create program-associated data in step 240. The program-associated data may include FPAD that is used for providing authorization to the user device to access various content by providing rules and pay-per-view identifiers.

The DTSS 250 may be used to schedule various types of content. The traffic and scheduling system (DTSS) 250 may be used to input linear materials through a system operator in step 252. In step 254, linear common authorization pay-per-view may be generated or created in step 254. In step 256, the program-associated data may be created and correspond to different formats such as non-linear, standard definition, non-linear, high-definition, linear standard definition, and linear high-definition. Pay-per-view services may also be created in step 258 of the DTSS 250.

A push scheduling system 260 may be used to get non-linear materials from a file location. The push scheduling system 260 may be used to push various non-linear content to set top boxes or other user devices as will be further described below.

A subscription manager (SM) 270 may be in communication with the CMS 216, the ESS 232, and the DTSS 250. A pay-per-view manager web service 272 may be provided within the subscription manager 270. The pay-per-view manager web service 272 may be used to validate communications between the subscription manager and the various components such as the CMS 216, the ESS 232 and the DTSS 250. Communication signatures to verify validity may also be provided between the devices.

Various steps are also included within the subscription manager 270. After the pay-per-view manager web service 272 determines the validity and checks any signatures associated with communications from other components, it is determined in step 274 whether a common authorization has been requested. If a common authorization has been requested, it is determined in step 276 whether a common authorization has been previously provided. If the common authorization has not been provided, a new purchasable pay-per-view identifier may be generated in step 278. The pay-per-view identifier may be for the particular type or format of linear/non-linear/high-definition/standard-definition content from the device. However, the present example is provided with respect to associating non-linear-standard definition, non-linear-high-definition, linear-standard definition and linear-high definition formats with each other so that they may be used as a common authorization. Thus, at the same time, the other pay-per-view IDs are generated for the other formats in step 280. In step 282, it is determined whether the purchasable pay-per-view is linear.

Referring back to step 276, if the pay-per-view IDs have been generated, step 285 may be performed. In step 285, the pay-per-view IDs may be updated to be purchasable within the subscription manager and a conditional access management center. After step 285 and after step 282 indicates non-linear, step 286 may generate a send to IT flag (SendToITFlag). IT refers to an IT database 290. If the SendToITFlag is provided, step 292 saves the content into the ITREP database 290. If the SendToITFlag has not been activated, the system returns the pay-per-view IDs in step 284 as described above. The control of forwarding PPV ID information to ITREP ensures that that the PPV is purchasable via order-ahead at the proper time.

If the content is not a common authorization content in step 274, it still may be part of a group of content purchased in a package. Step 300 determines whether a group identifier is available. In step 300, if a group identifier is available, steps 285 and 286 are again generated. In step 300, if a group identifier does not exist, step 302 creates a new pay-per-view identifier as initiated by step 258 within the DTSS 250. In step 304, it is determined whether the CAMC identifier is also a common authorization identifier. If the CAMC identifier is not a common authorization identifier, step 306 is performed. In step 306, a pay-per-view identifier is initiated at a conditional access system. Thereafter, steps 286 and 284 are performed as described above. Referring back to step 304, when the conditional access identifier is a common authorization identifier, step 284 returns the pay-per-view list with pay-per-view identifiers. The steps illustrated in step 300-306 will be described in further detail below. Steps 300-306 may relate to packages such as groups of content that have been packaged together such that when the package is purchased, access to all the content listed in the package may be provided. Thus, although the packages may not have common authorization as determined in step 274, access to multiple identifiers or content identifiers may be provided.

The subscription manager 270 may also include a service listing web service 320. The service listing web service 320 may provide pay-per-view and continuous service information to the DLS or program guide web service 322. Also, the pricing and various services available may be determined in step 324.

The subscription manager 270 may also be in communication with a conditional access system. The conditional access system may include a conditional access web service 330 which interfaces with a T20 Handler (T20H) 610 and conditional access management center (CAMC) 140. The T20H supports throttling and filtering of PPV authorizations. The CAMC is used to authorize order-ahead PPV purchases.

The conditional access processor 332 may generate PAD that includes the pay-per-view identifiers for the different pay-per-view format signals as described above in steps 278 and 280. Authorizations may be provided to the customer device via the PAD created by the CAP 332. Authorization may be provided by providing PPV identifiers and rules associated with the PPV identifiers so that viewing of other formats of a content may be provided. The purchasable status of a particular format of a content may also be updated from step 285. The conditional access processor 332 may also be in communication with the CMS 216 and ESS 232.

Referring back to the CMS 216, when content is received and an inventory is created, an external data input may be used for the identifier. The external data input may provide external data corresponding to the type of content itself rather than the format of the content. Thus, each of the formats such as non-linear-standard definition, non-linear-high-definition, linear-standard definition and linear-high-definition may all have a common external data system identifier and thus may be linked thereby. The external data system as illustrated in FIG. 3A is a Times Media Service® (TMS). The external data system may also be internally generated within DIRECTV® or the content-providing system so long as the base content is referred to with the same identifier.

Figure 4:
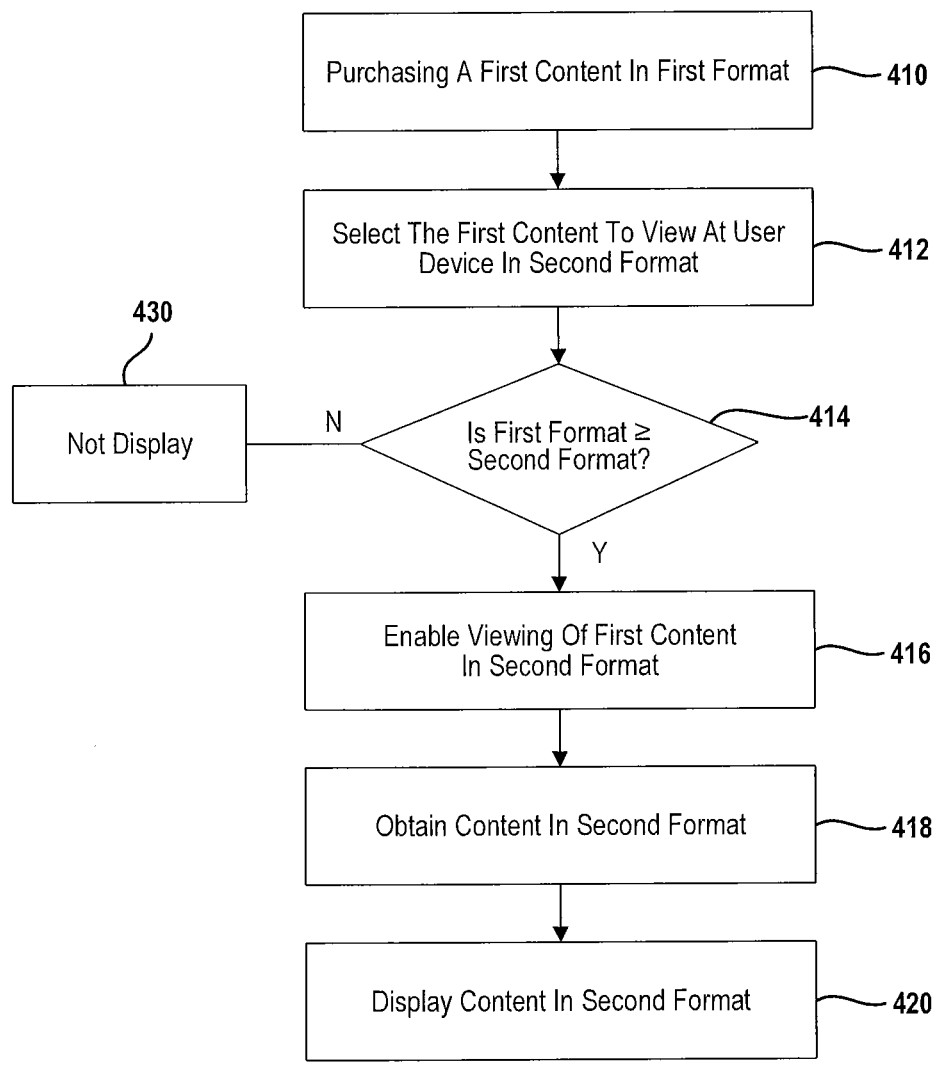
FIG. 4 is a flowchart of a high-level method for purchasing and enabling various format viewing.

Referring now to FIG. 4, the system operation with respect to purchasing a particular content and authorizing multiple content is illustrated. In step 410, a first content in a first format is purchased. The present example provides four different format contents. However, various other numbers of formats may be provided. As few as two formats may be provided. In step 412, the first content may be viewed at a user device using a second format that is different than the first format of step 410. In step 414, it is determined whether the first format is greater to or equal than the second format. This step is an optional step since all content corresponding to the same TMS identifier may be provided access. However, content levels and rules may be provided for providing other format contents in a viewable format. In step 414, it is determined whether the first format is greater to or equal than the second format. An example of one format being greater than another format is a high-definition format being greater than the standard definition format. Content that may be equal in format includes linear versus non-linear format. When the first format corresponding to the first content is greater than or equal to the second content format for the first content, step 416 enables viewing of the first content in the second format. This may be enabled through the set top box or other user device. A flag may be set that enables the viewing of the second format. Another way to determine greater than or equal to is by the cost of the service. Access to less expensive content formats than the one purchased may be provided based on the price of the service.

Step 418 is optional. For non-linear content, the content may already exist and be immediately available for display. For linear content, it may be necessary to wait for the next linear broadcast before the content is displayed. In step 420, the content is displayed on the display associated with the user device in the second format after comparing the flag, PPV identifier or other identifier with the received content.

Referring back to step 414, if the first format is not greater than or equal to the second format, the second format of the first content may not be displayed in step 430.

Figure 5:
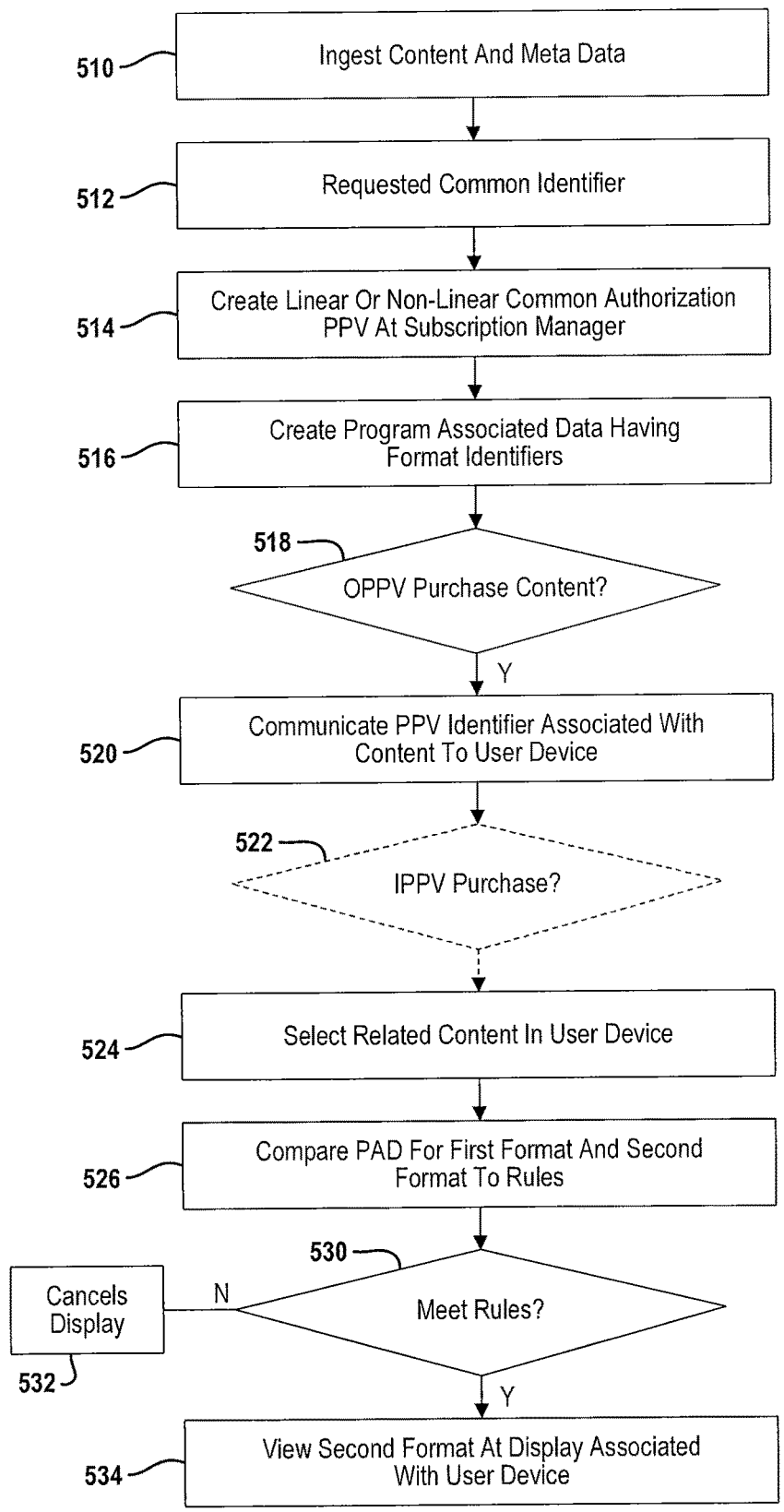
FIG. 5 is a more detailed flowchart of a method for the operation of the subscription manager.

A more detailed method for supporting purchase, authorization and display of common authorization is illustrated in FIG. 5. In step 510, content is ingested with the metadata. In step 512, the common identifiers are requested from the subscription manager. In step 514, the linear or non-linear common authorization pay-per-view identifiers in high-definition and/or standard definition are generated at the subscription manager. In step 516, program-associated data such as FPAD may be generated that includes all of the pay-per-view identifiers for all the formats available.

In step 518, it is determined whether order-ahead purchase (OPPV) content has been requested. If order-ahead purchase content has been requested, step 520 communicates the pay-per-view identifier associated with the content to the user device in a data CAP (conditional access packet). This step may not be performed if step 522 is performed.

As mentioned above, the content may also be impulse pay-per-view purchased which is accounted for in step 522. Step 522 is an optional step. When the impulse pay-per-view is purchased in step 522, step 524 determines whether related content is selected in the user device.

In step 526, the program-associated data such as the pay-per-view identifier is compared to the rules. Examples of rules include when linear content is provided, access to all of the same non-linear content may also be provided and vise versa. Rules may also include that when a high-definition format of content is paid for, all standard definition content corresponding to the same content may be provided. However, when standard definition content is paid for, access to high-definition format content may be denied. In step 530, it is determined whether the rules have been met. If the rules have not been met, step 532 disallows the display of the second format. This may include generating an error message. This may also keep the display from displaying the paid-for format content.

In step 534, when the rules have been met in step 530, the second format signals may be displayed associated with the user device.

Figure 6:
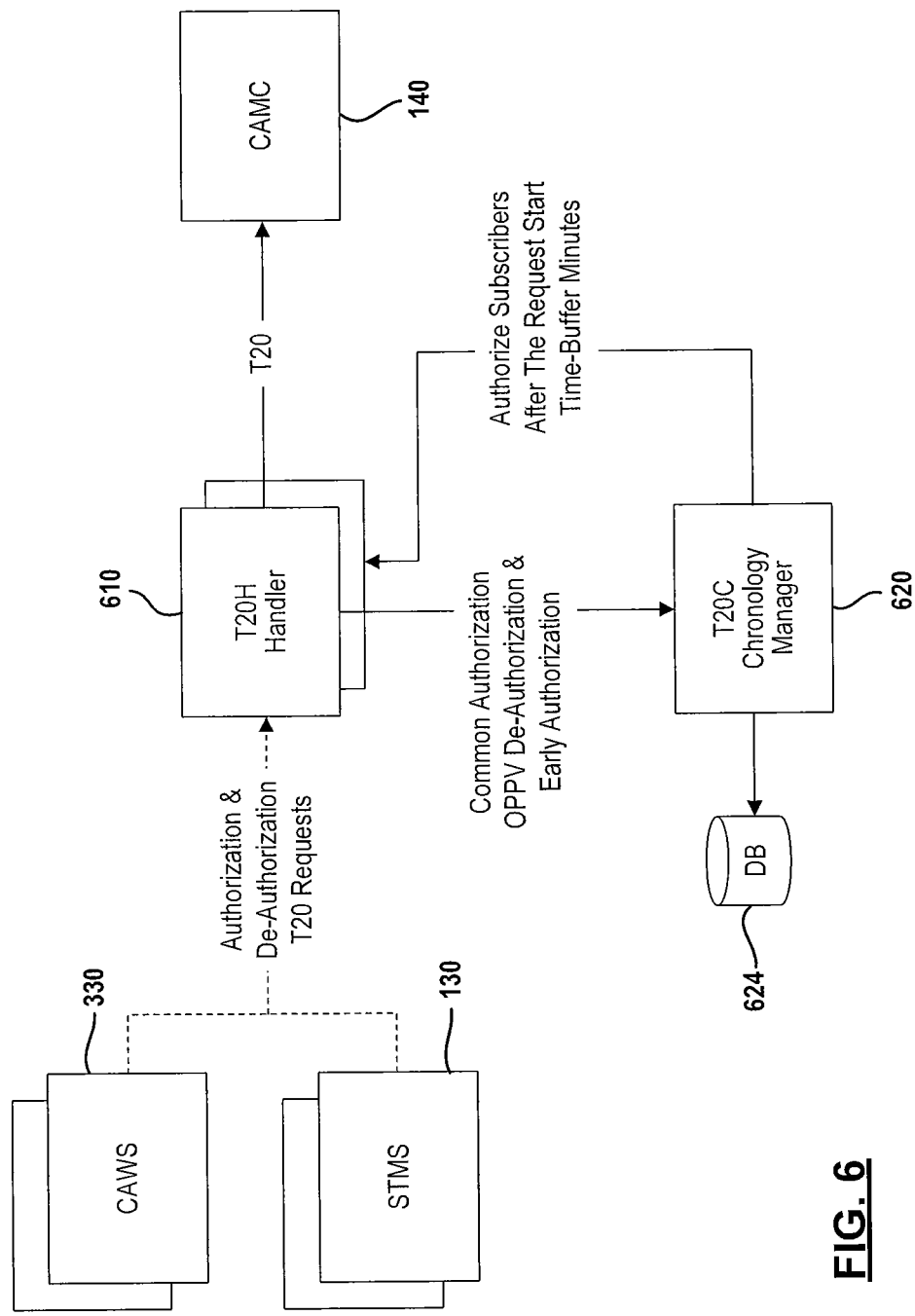
FIG. 6 is a block diagrammatic view of a handler and manager for providing proper order-ahead pay-per-view authorizations to a user device.

Referring now to FIG. 6, a system for handling requests to the conditional access management center 140 may be provided. It should be noted that order-ahead pay-per-views may not be immediately sent to the conditional access system. Pay-per-view identifiers, such as daily 24-hour rentals, may not be authorized until the day of rental to prevent a free time period of access or viewing between the ordering time and the date of authorization. Therefore, a handler system (T20H) 610 may intercept authorization and de-authorization requests and delay the authorization communication until the beginning of the paid-for access time. A chronological handler (T20C) 620 may receive the authorization and de-authorization requests and store them within a database 624. The request may be compared to the database for the current time and authorize subscribers at a requested start time, rather than immediately. The T20C 620 then provides conditional access signals (via the T20H 610 and CAMC 140) that may be provided to the user devices so that access may be granted to the user device in time for the broadcast. For example, just prior to the beginning of a broadcasting day for a rental period, the conditional access management system (CAMC 140) may grant conditional access to the various pay-per-view identifiers. In short, the T20H 610 handles or monitors the requests sent to the CAMC 140. The T20H 610 intercepts the order-ahead pay-per-view authorization and cancellation requests and passes the requests to the T20C 620. The order-ahead pay-per-view start time is calculated from the order-ahead pay-per-view expiration day and the rental hours. When the T20H 610 includes a pre-authorization request and the T20C 620 is not available, the T20H 610 returns an error message to the client instead of sending a pre-authorization request to the CAMC 140 which may authorize a subscriber for free. When the CAMC 140 returns a failure, the handler may send a cancel command to the T20C 620 to remove the pre-authorization pay-per-view.

Figure 7:
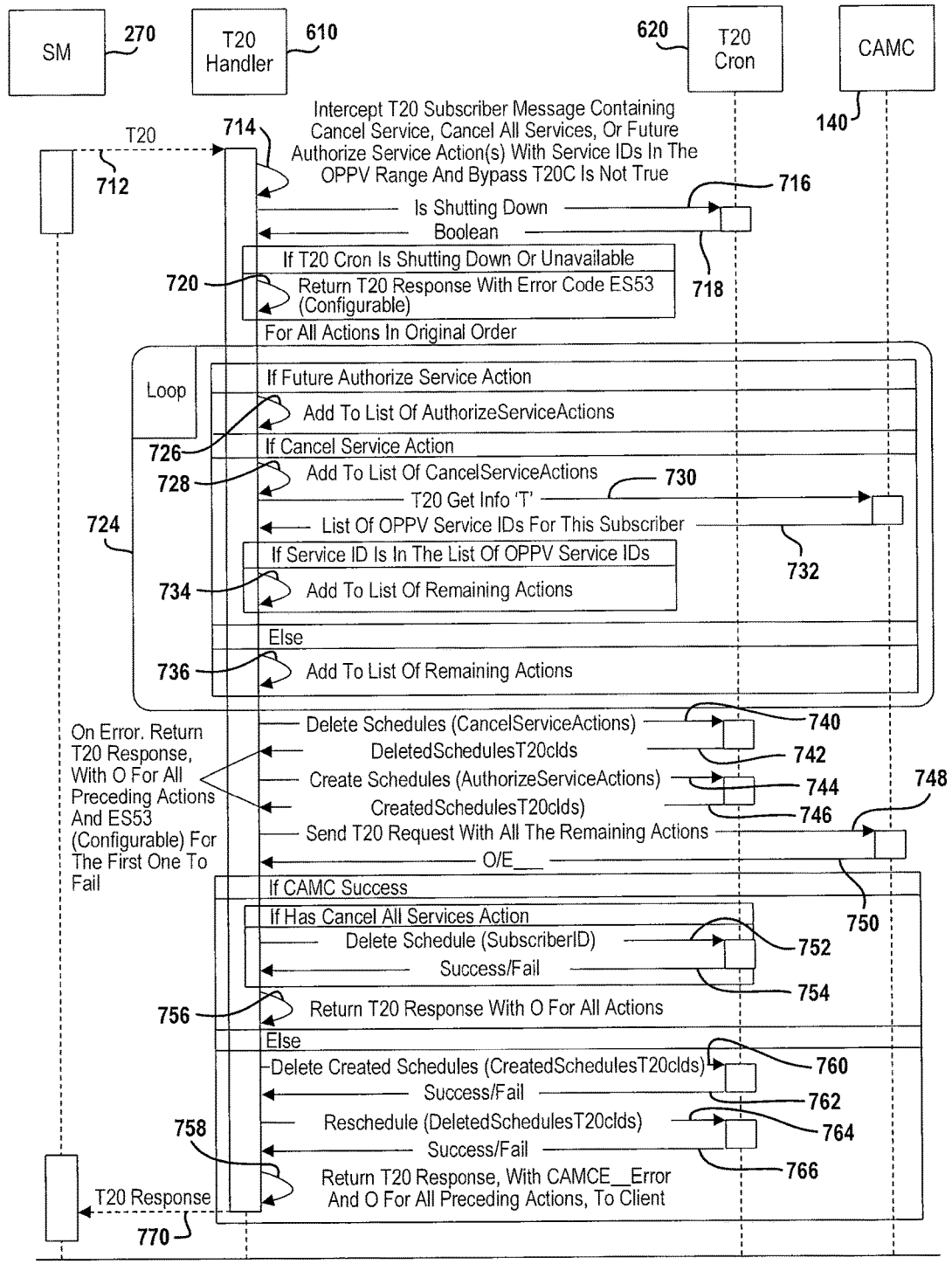
FIG. 7 is a timing chart of the signals between a subscription manager, a handler, a chronology manager and a conditional access system.

Referring now to FIG. 7, a method for monitoring messages and authorization is set forth. An authorization message may be intercepted by the T20H 610. The T20H 610 may intercept messages for order-ahead pay-per-view (OPPV) signals 712. Step 714 illustrates that the T20H 610 may intercept subscriber messages containing a cancel service, cancel all service, or future authorization of a service with service IDs in the order-ahead pay-per-view range and when the bypass T20C signal is not true in signal 714. In step 716, it is determined whether or not the T20C 620 is shutting down. Step 718 generates a return signal. When the T20C 620 is shutting down or unavailable as indicated by signal 718, step 720 returns a response with an error code in step 720.

For all of the other actions, the group of signals in box 724 may be provided in the loop. If future authorization action is provided, step 726 adds to the list of authorized service actions. If a cancel service action is generated, step 728 adds to the list of cancel service actions. In step 730, information from the conditional access system may be requested. In step 732, the list of order-ahead pay-per-view service identifiers for the particular subscriber may be provided from the conditional access system. If the service identifier is in the list of order-ahead pay-per-view service identifiers, step 734 adds to the list of remaining actions. If none of the conditions of steps 726, 728 or 734 are applicable, step 736 adds to the list of remaining actions.

Step 740 may delete a schedule between the T20H 610 and T20C 620. The deleted schedules may be provided back to the T20H 610 from the T20C 620 in step 742. The T20H 610 may create schedules in step 744 as requested from the T20C 620. When the schedules have been created, a signal 746 may be provided from the T20C 620 to the T20H 610. A T20 request with all remaining actions may be provided from the T20H 610 to the CAMC 140 in step 748. A status signal may be generated from the CAMC 140 using signal 750. If all services have been successfully cancelled at the conditional access system, the T20H 610 generates a delete schedule signal to the T20C 620 in step 752 which is responded to at the T20C 620 by a success or failure signal 754. A return response "0" may be generated at step 756 for all actions. If the cancel all service action is not requested, step 760 may generate a delete created schedules signal to the T20C 620. A success or failure signal may be generated from the T20C 620 to the T20H 610 in step 762. The T20H 610 may generate a reschedule signal and communicate the reschedule signal to the T20C 620 in step 764. A success or failure of the receipt of the reschedule signal may be generated in step 766. In step 768, a return response with an error and "0" for all preceding actions may be returned to the client such as the subscription manager in step 770.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method for communicating content comprising:
selecting and purchasing, at a first device, a first content in a first format having a content identifier;
viewing the first content at the first device;
selecting the first content in a second format for viewing at a second user device;
comparing the first format and the second format to determine whether the first format is greater than or equal to the second format;
enabling viewing of the first content in the second format based on purchasing the first content in the first format when the first format is greater than or equal to the second format in response to comparing; and
selecting and viewing the first content in the second format at the second user device.

2. The method as recited in claim 1 wherein purchasing the first content in the first format comprises purchasing the first content in the first format using a mobile phone.

3. The method as recited in claim 1 wherein purchasing the first content in the first format comprises purchasing an order-ahead pay per view in the first format.

4. The method as recited in claim 1 wherein purchasing the first content in the first format comprises purchasing an impulse pay per view in the first format.

5. The method as recited in claim 1 wherein purchasing the first content in the first format comprises purchasing the first content in the first format using a website ordering system.

6. The method as recited in claim 1 wherein selecting the first content in the second format comprises selecting the first content in the second format from a program guide.

7. The method as recited in claim 1 wherein the first format comprises a high definition format and wherein the second format comprises a standard definition format.

8. The method as recited in claim 1 wherein the first format comprises a high definition format and wherein the second format comprises a high definition format.

9. The method as recited in claim 1 wherein the first format comprises a standard definition format and wherein the second format comprises a standard definition format.

10. The method as recited in claim 1 wherein the first format comprises a non-linear format and wherein the second format comprises a linear format.

11. The method as recited in claim 1 wherein the first format comprises a linear format and wherein the second format comprises a non-linear format.

12. A method comprising:
generating a first identifier associated with a first content in a first format at a subscription manager;
generating a second identifier associated with the first content for a second format at the subscription manager, said first identifier different than the second identifier;
communicating the first identifier, the second identifier and rules to a user device;
enabling the first content with the first format in response to purchasing the first content in the first format;
receiving and displaying the first content at the user device;
selecting the first content in the second format at the user device;
enabling access to the first content in the second format in response to purchasing the first content in the first format and the rules; and
receiving and displaying the first content at the user device.

13. The method as recited in claim 12 wherein prior to generating the first identifier and generating the second identifier, encrypting the first content into the first format and the second format.

14. The method as recited in claim 12 wherein communicating the first identifier, the second identifier and the rules to the user device comprises communicating the first identifier, the second identifier and the rules to the user device within program associated data.

15. The method as recited in claim 12 wherein enabling access to the first content in the second format in response to purchasing the first content in the first format and the rules comprises enabling access to the first content in the second format in response to purchasing the first content in the first format and the first format being greater than the second format.

16. The method as recited in claim 12 wherein the first format comprises a high definition format and wherein the second format comprises a standard definition format.

17. The method as recited in claim 12 wherein the first format comprises a high definition format and wherein the second format comprises a high definition format.

18. The method as recited in claim 12 wherein the first format comprises a standard definition format and wherein the second format comprises a standard definition format.

19. The method as recited in claim 12 wherein the first format comprises a non-linear format and wherein the second format comprises a linear format.

20. The method as recited in claim 12 wherein the first format comprises a linear format and wherein the second format comprises a non-linear format.

21. The method as recited in claim 12 wherein selecting the first content in the second format comprises selecting the first content in the second format from the user device.

22. The method as recited in claim 12 wherein enabling the first content comprises communicating an authorization signal for the first content in the first format to the user device.

23. The method as recited in claim 22 wherein communicating the authorization signal comprises communicating the authorization signal proximate a start time.

24. The method as recited in claim 23 wherein communicating the authorization signal comprises communicating the authorization signal proximate the start time of an order-ahead pay per view.

25. The method as recited in claim 22 wherein communicating the authorization signal comprises communicating the authorization signal to a conditional access system proximate a start time.

26. A system comprising:
a user device;
a subscription manager that generates a first identifier associated with a first content in a first format and a second identifier associated with the first content in a second format; and
a conditional access system that communicates the first identifier, the second identifier and rules to the user device;
said user device selecting the first content in the first format, receiving and displaying the first content in the first format in response to purchasing the first content in the first format, said user device selecting the first content in the second format and receiving and displaying the first content in the second format in response to purchasing the first content in the first format and the rules at the user device.

27. The system as recited in claim 26 further comprising a content management system encrypting the first content into the first format and the second format.

28. A system as recited in claim 26 wherein the conditional access system communicates the first identifier, the second identifier and the rules to the user device within program associated data.

29. The system as recited in claim 26 wherein the user device is enabled to receive and display the first content in the second format in response to purchasing the first content and the first format being greater than the second format.

30. The system as recited in claim 26 wherein the first format comprises a high definition format and wherein the second format comprises a standard definition format.

31. The system as recited in claim 26 wherein the first format comprises a high definition format and wherein the second format comprises a high definition format.

32. The method as recited in claim 26 wherein the first format comprises a standard definition format and wherein the second format comprises a standard definition format.

33. The method as recited in claim 26 wherein the first format comprises a non-linear format and wherein the second format comprises a linear format.

34. The system as recited in claim 26 wherein the first format comprises a linear format and wherein the second format comprises a non-linear format.

35. The system as recited in claim 26 wherein the conditional access system communicates an authorization signal for the first content in the first format to the user device.

36. The system as recited in claim 35 further comprising a handler system that receives the authorization signal and communicates the authorization signal proximate an authorization start time.

37. The system as recited in claim 36 wherein the handler system communicates the authorization signal proximate the authorization start time for an order-ahead pay per view.

* * * * *